United States Patent
Huber et al.

(10) Patent No.: US 9,951,739 B2
(45) Date of Patent: Apr. 24, 2018

(54) START/STOP SYSTEM FOR A MOTOR VEHICLE DRIVE

(71) Applicant: Continental Automotive GmbH, Hannover (DE)

(72) Inventors: Tobias Huber, Sinzing (DE); Hans-Walter Woerz, Munich (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 37 days.

(21) Appl. No.: 14/991,267

(22) Filed: Jan. 8, 2016

(65) Prior Publication Data

US 2016/0215747 A1 Jul. 28, 2016

(30) Foreign Application Priority Data

Jan. 27, 2015 (DE) .................. 10 2015 201 344

(51) Int. Cl.
*F02N 11/08* (2006.01)
*F02D 29/02* (2006.01)

(52) U.S. Cl.
CPC .......... *F02N 11/0837* (2013.01); *F02D 29/02* (2013.01); *F02N 2200/125* (2013.01); *F02N 2300/2006* (2013.01); *Y02T 10/48* (2013.01)

(58) Field of Classification Search
CPC ....... B60W 10/06; B60W 10/08; Y02T 10/48; Y02T 10/642; F02N 11/0837; F02N 2200/125; F02N 2300/2006
USPC ............... 701/112, 113; 123/179.11, 179.23, 123/179.4; 307/10.6
See application file for complete search history.

(56) References Cited

U.S. PATENT DOCUMENTS

| | | | |
|---|---|---|---|
| 4,454,789 A | 6/1984 | Kaspar et al. | 477/83 |
| 6,629,515 B1 | 10/2003 | Yamamoto et al. | 123/179.4 |
| 7,831,369 B2 | 11/2010 | Naik et al. | 701/96 |
| 8,410,957 B2 * | 4/2013 | Mizuno | G08G 1/07 340/438 |
| 8,452,523 B2 | 5/2013 | Nitz et al. | 701/112 |
| 2003/0029406 A1 | 2/2003 | Weiss | 123/179.4 |
| 2006/0273925 A1 * | 12/2006 | Schwartz | G08G 1/087 340/907 |
| 2008/0272936 A1 * | 11/2008 | Kim | G08G 1/095 340/929 |

(Continued)

FOREIGN PATENT DOCUMENTS

| | | | |
|---|---|---|---|
| DE | 2945304 C2 | 12/1982 | B60K 26/00 |
| DE | 10139595 A1 | 2/2003 | B60K 31/00 |

(Continued)

OTHER PUBLICATIONS

German Office Action, Application No. 102015201344.8, 6 pages, dated Sep. 23, 2015.

*Primary Examiner* — John Kwon
*Assistant Examiner* — Johnny H Hoang
(74) *Attorney, Agent, or Firm* — Slayden Grubert Beard PLLC

(57) ABSTRACT

A method for preparing a start/stop system of a motor vehicle drive for a future driveaway process may include determining a future change time of a traffic light signal emitter from red light to green light; and automatically starting an internal combustion engine of the motor vehicle drive at a start time which comes before the future change time by a predetermined duration.

18 Claims, 1 Drawing Sheet

(56) References Cited

U.S. PATENT DOCUMENTS

| | | | | |
|---|---|---|---|---|
| 2009/0299549 A1* | 12/2009 | Albertson | ............ | B60W 10/06 |
| | | | | 701/2 |
| 2010/0010729 A1* | 1/2010 | Hutchinson | ...... | G08G 1/096725 |
| | | | | 701/117 |
| 2011/0006914 A1* | 1/2011 | Tsuda | .................... | H04W 16/30 |
| | | | | 340/905 |
| 2011/0246050 A1* | 10/2011 | Roessle | ............... | F02N 11/0855 |
| | | | | 701/113 |
| 2012/0029730 A1* | 2/2012 | Nagura | ............... | F02N 11/0837 |
| | | | | 701/2 |
| 2012/0191330 A1* | 7/2012 | Nitz | .................... | F02N 11/0822 |
| | | | | 701/113 |
| 2014/0257637 A1* | 9/2014 | Sangameswaran | ..... | F02D 29/02 |
| | | | | 701/41 |
| 2014/0257677 A1* | 9/2014 | Sangameswaran | ..... | F02D 45/00 |
| | | | | 701/112 |
| 2015/0112800 A1* | 4/2015 | Binion | ............... | G06Q 30/0255 |
| | | | | 705/14.53 |
| 2015/0154859 A1* | 6/2015 | Yang | ........................ | G08G 1/00 |
| | | | | 701/117 |

FOREIGN PATENT DOCUMENTS

| | | | | |
|---|---|---|---|---|
| DE | 202004003215 U1 | 4/2004 | ............. | F02N 11/08 |
| DE | 112006003123 T5 | 9/2008 | ............. | G06F 17/00 |
| DE | 102009042309 A1 | 4/2010 | ............. | F02D 17/00 |
| DE | 102009050520 A1 | 4/2011 | ............. | F02D 45/00 |
| DE | 102012211420 A1 | 5/2014 | ............. | F02D 45/00 |

\* cited by examiner

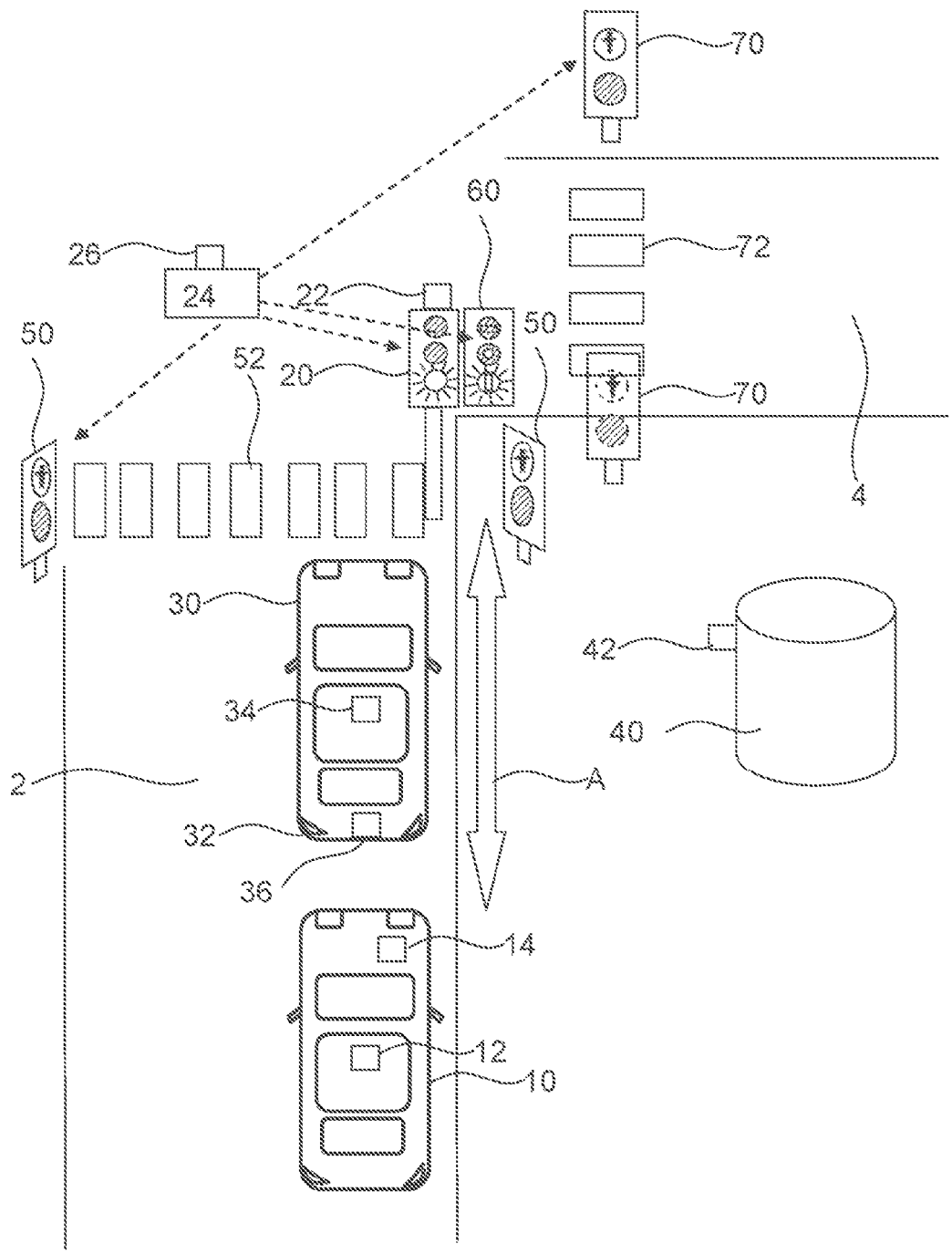

START/STOP SYSTEM FOR A MOTOR VEHICLE DRIVE

CROSS-REFERENCE TO RELATED APPLICATIONS

This application claims priority to DE Application No. 10 2015 201 344.8 filed Jan. 27, 2015, the contents of which are hereby incorporated by reference in their entirety.

TECHNICAL FIELD

This disclosure relates to internal combustion engines for motor vehicles. More particularly it relates to systems for start/stop of internal combustion engines.

BACKGROUND

Motor vehicles comprising internal combustion engines also consume fuel when at a standstill, and so it is beneficial in terms of energy to turn off the internal combustion engine and restart it later, especially during relatively long stationary phases.

In order to design this process of the operation mode control of the internal combustion engine to be comfortable, DE 2945304 C2 proposes an automatic shutoff and an automatic start of an internal combustion engine. According to the procedure described therein, the internal combustion engine is restarted solely via actuation of the gas pedal.

SUMMARY

It was recognized that the known start/stop systems cause an unwanted delay, and so the driver cannot immediately drive off, as desired, when the traffic situation changes.

A problem addressed by the invention is therefore that of creating a possibility for at least partially improving the reduced operating comfort associated with the delay.

One embodiment of the present disclosure includes a method for preparing a start/stop system of a motor vehicle drive for a future driveaway process. The method may include: determining a future change time of a traffic light signal emitter from red light to green light; and automatically starting an internal combustion engine of the motor vehicle drive at a start time which comes before the future change time by a predetermined duration.

Another embodiment of a method for preparing a start/stop system of a motor vehicle drive for a future driveaway process may include: determining a future driveaway process of the motor vehicle drive by detecting an increase in torque or speed or a start of a drive of at least one preceding vehicle; and automatically starting an internal combustion engine of the motor vehicle drive at the time at which the future driveaway process is determined or delayed with respect thereto by a predetermined duration.

Another embodiment of the present disclosure may include a system for operating a motor vehicle drive comprising an internal combustion engine for driving the motor vehicle and a controller. The controller may be configured to: determine a future change time of a traffic light signal emitter from red light to green light; and automatically start the internal combustion engine of the motor vehicle drive at a start time which comes before the future change time by a predetermined duration.

BRIEF DESCRIPTION OF THE DRAWING

FIG. 1 shows a traffic situation for explaining an embodiment of the method described here.

DETAILED DESCRIPTION

In one embodiment, a method for preparing a start/stop system of a motor vehicle drive for a future driveaway process includes starting the internal combustion engine when a driveaway command from the driver is expected. In particular, the internal combustion engine is automatically started when it is (automatically) detected that a driveaway process is possible or expected. Therefore, it is not the reaction to a gas pedal movement which is referred to as automatic starting, as is the case in the initially mentioned prior art, but rather a reaction to an (automatically) detected event, without the need for the driver to issue a corresponding command. The method described here provides an automatic start of the internal combustion engine even before the driver actually presses the gas pedal or issues another driveaway command, and so the internal combustion engine is already running when the expected driveaway command input by the driver is detected. The reaction to a driveaway command of the driver (whether it is input via a button or via the movement of the gas pedal) is not considered to be automatic, since the original event on which this is based is a driver input. Instead, signals outside the particular motor vehicle are detected, for example, signals from traffic light signal emitters, time signals originating from other vehicles or from a central database or from a central control, or start processes of preceding vehicles, in order to automatically start the internal combustion engine on the basis of these external events and signals, in particular independently of driver inputs. According to the method, the internal combustion engine is also automatically started when a corresponding driving signal (from this vehicle itself) is not present.

The result thereof is a substantially improved response of the motor vehicle drive, since the drive is already running at the time of the driveaway and there is no need to also wait for the starting process. Furthermore, the driver is automatically informed of a future (possible) driveaway process, since the engine starts up and the driver can recognize this as a sign that traffic is now moving forward again. The idea according to the invention of starting the motor vehicle drive in advance so that the start command reaches an already prepared or running motor vehicle drive system can be implemented by means of two approaches. Both of the approaches are based on the assumption that an event which usually precedes the starting process is automatically detected. According to the first approach, which is reflected in the independent claim mentioned first (claim 1), a traffic light signal emitter ("traffic light") is used as the information source for the detection of the event, since the light signal emitter has a direct influence on the traffic flow. A second approach, which is reflected by the independent claim mentioned second, is to detect the changed traffic flow itself, which is controlled by the light signal emitter, and so signals which reflect the traffic flow itself act as the information source. Whereas the first approach is therefore based on the detection of the traffic flow control, the second approach relates to the detection of information which reflects the traffic flow itself. In both approaches, the intention is to detect a future driveaway process, i.e., a start in traffic flow after a phase of stopped traffic.

A method is therefore described for preparing a start/stop system of a motor vehicle drive for a future (in particular the next) driveaway process. According to the method, a future time at which a traffic light signal emitter changes from a red light (generally: a stop instruction) to a green light (generally: a drive instruction) is determined. Subsequent thereto, an internal combustion engine of the motor vehicle drive is automatically started at a start time. This start time precedes the future change time by a predetermined duration.

The change time and the time at which the driveaway process is anticipated correspond to one another. The future change time to be determined marks the time at which the traffic flow control ends a stop phase. Since it can be assumed that the motor vehicle having the motor vehicle drive which is prepared (i.e., the ego vehicle) subsequently drives away or the driver issues a related command, the internal combustion engine is started already so that a running internal combustion engine can be provided at the (future) start time. The predetermined duration can depend on the traffic flow-induced delay between the end of the stop phase, which is indicated by the light signal emitter (or the traffic flow control), and the actual start time of the motor vehicle drive. In other words, the predetermined duration can depend on a delay between the traffic flow control and the actual traffic flow (with respect to the ego vehicle).

If the ego vehicle stops directly at the light signal emitter, then the predetermined duration can also be zero. If delays are expected between the change time of the traffic light signal emitter and the actual driveaway process (of the ego vehicle) due, for example, to other traffic participants between the ego vehicle and the light signal emitter, the predetermined duration can also have a duration of >0 s.

On the one hand, the method is intended, as indicated, to prepare the start/stop system which actuates the motor vehicle drive to accelerate in response to a command from the driver, but is also intended to prepare the motor vehicle drive in order to provide this in a running state when the driveaway process is input by the driver via a suitable interface, for example, the gas pedal.

The determination of the future change time of the traffic light signal emitter is based on external information which is received, detected, and/or processed by the start/stop system. The external information relates either to the light signal emitter itself or to the present change time, but can also be events linked thereto, however, which are causally linked to the change of the light signal emitter from a red light to a green light. Furthermore, the external information can also be historical data on change times of the light signal emitter so that a current state can be deduced on the basis of this information. Information sources can be other vehicles, a stationary database, the control of the light signal emitter itself or optical signals of another light signal emitter which is controlled jointly with the aforementioned traffic light signal emitter or whose control is linked to the control of the traffic light signal emitter.

According to a first embodiment of the invention, the determination step includes receiving a time signal which represents the future change time. Alternatively, the time signal can characterize the time at which the change time occurs. In other words, the time signal itself can carry the change time as time information, or the time at which the time signal occurs characterizes the change time itself, for example, if the time signal occurs before the change time by a known duration.

The time signal can be emitted, as a radio signal, from at least one further vehicle, from the traffic light signal emitter, or from a higher-order control of the traffic light signal emitter, in particular from a control of the light signal emitter of a traffic intersection. The radio signal can be implemented as car-to-car or X-to-car transmission. It is possible that preceding vehicles, in particular vehicles situated between the ego vehicle and the traffic light signal emitter, emit the time signal after these vehicles have detected the time signal itself (via transmission from the light signal emitter or a control of the light signal emitter) or have determined the time signal itself, for example, via image recognition within an image of the light signal emitter. The traffic light signal emitter itself can emit a corresponding radio signal, for example, in that this traffic light signal emitter is equipped with a radio interface. The light signal emitter can emit, via the radio interface, for example, a WLAN signal or another radio signal for close range, which can be detected by the vehicles whose traffic guidance is defined by the light signal emitter. This corresponds to a local solution, wherein the radio signal is only transmitted locally by the light signal emitter to the applicable vehicles.

Alternatively, a higher-order control of the traffic light signal emitter can emit the time signal either as a close-range radio signal as described above or as a radio signal having a relatively great transmission range, and so the radio signal is also available for vehicles which are not located at the traffic light signal emitter. A close range is considered to be a range within a transmission range of 5 m to 100 m or 10 m to 300 m, in particular a range in which only one signal emitter of a signal intersection is located. A radio signal having a relatively great transmission range is considered to be a range having a transmission range of at least 500 m, 5 km or 20 km. Signal emitters of multiple intersections are located within this transmission range.

Alternatively, the time signal can also be emitted as an optical signal from a further vehicle or by the traffic light signal emitter. In this case, the vehicle and/or the traffic light signal emitter can emit an optical signal for a first purpose (direction indication, braking light, etc.), which is modulated with a signal which represents the time signal in order to fulfill a second purpose (specifically, the transmission of the time signal). Furthermore, the first purpose can be the traffic control by the light signal emitter or, as mentioned, the lighting of vehicles (the braking light or the parking light, for example) required according to traffic regulations. In the latter variant, the vehicle, in particular, forwards received data, for example, the time signal received from the other vehicle, or forwards the time signal as a signal which was detected by the other vehicle itself, for example, according to the method described here.

Furthermore, the time signal can be emitted as an acoustic signal, in particular as an ultrasonic signal, from a further vehicle or from a source of sound installed downstream of the traffic light signal emitter. The time signal can be emitted, in particular, as an ultrasonic signal of a distance detection system of the other vehicle. In this case, the distance detection system is also used for data transmission. If the source of sound is installed downstream of the traffic light signal emitter, this functionally corresponds (apart from the type of transmission) to the aforementioned radio interface and emits the time signal as a modulated ultrasonic signal. The ego vehicle can therefore also detect the time signal using sensors which are part of a distance detection system of the ego vehicle.

Furthermore, as mentioned, the step of determining the future change time can be based on historical data, for example, in order to estimate a time pattern from previous change times, from which time pattern the next, future change time is determined. Previous change times from red light to green light can be detected by means of optical detection devices (camera systems, for example, which optionally have downstream image detection) of multiple vehicles. These previous change times are transmitted from the closer vehicles directly to the start/stop system of the motor vehicle drive, either directly or via a stationary database from which the start/stop system calls up the previous change times (i.e., the historical data). The transmission of the change times by the other vehicles can take place via a car-to-X data link or a car-to-car data link. On the basis of these previous change times, the start/stop system of the motor vehicle drive (i.e., the ego vehicle) estimates or extrapolates the future change time. The next, future change time is generally referred to as the future change time, wherein the one after the next or the subsequent change times can also be referred to as such, however, in particular when a traffic light signal emitter cannot be passed until after multiple red phases. The historical data used here, i.e., the previous change times, were originally detected by means of multiple vehicles which carry optical detection devices in order to receive the light signal of the traffic light signal emitter (of previous red phases, in particular).

Furthermore, the historical data can be determined from driving data of multiple vehicles, in particular on the basis of previous stop phases at the traffic light signal emitter. The temporal traffic control pattern of the traffic light signal emitter can be determined on the basis of the stop phases of multiple vehicles at the traffic light signal emitter. These stop phases or, generally, the driving data (depicted as a speed curve, for example) are transmitted to the start/stop system of the motor vehicle drive. In particular, these data are transmitted directly to the start/stop system or are transmitted to a stationary database which is accessed by the start/stop system. Car-to-X or car-to-car transmission protocols can also be used here for transmission. The future (next) change time is estimated or extrapolated on the basis of these transmitted stop phases, wherein the estimation or extrapolation is carried out by the start/stop system of the motor vehicle drive.

The estimation or extrapolation steps depicted in the preceding embodiments are carried out in the ego vehicle or in a calculation device within the ego vehicle. Alternatively, these steps can be carried out in another vehicle, and so this vehicle transmits the future (next) change time to the ego vehicle.

A further possibility is to use light signals of a light signal emitter which controls a traffic route linked to the traffic route controlled by the traffic light signal emitter. In this case, the traffic light signal emitter referred to is the light signal emitter for the general motor vehicle traffic which is decisive for the ego vehicle, i.e., for the motor vehicle comprising the start/stop system which is prepared according to the invention.

Linked light signal emitters are, in particular, pedestrian light signal emitters which are oriented transversely to the traffic light signal emitter. In other words, these are the pedestrian light signal emitters which regulate the pedestrian traffic of the street whose traffic is regulated by the traffic light signal emitter (decisive for the ego vehicle). Furthermore, a pedestrian light signal emitter which is oriented in the same direction as the traffic light signal emitter can be used. In other words, these are the pedestrian light signal emitters which regulate the pedestrian traffic of the street which intersects the street whose traffic is regulated by the traffic light signal emitter (decisive for the ego vehicle).

In addition, linked light signal emitters are light signal emitters of other vehicle types, for example, streetcar or bus light signal emitters, in particular light signal emitters for public local transportation. In this sense, the traffic light signal emitter which is decisive for the ego vehicle is a light signal emitter of private local transportation. Instead of or in combination with the aforementioned pedestrian light signal emitters, bicycle path light signal emitters which are oriented the same as the pedestrian light signal emitters can also be used. In particular, multiple light signal emitters can be used by linking their signals to one another, in particular by means of an AND conjunction, or in that one of the signals is used and at least one further signal acts as verification.

These streetcar or bus light signal emitters (generally: light signal emitters of public local transportation) are in the same direction of travel as the traffic light signal emitter which is decisive for the ego vehicle. Since the pedestrian light signal emitter of the pedestrian crossing of the same street or the streetcar or bus light signal emitter of the same street switches earlier than the traffic light signal emitter which regulates the private local transportation, the behavior thereof can be used to deduce a future change time.

The determination step therefore includes detection of the beginning of a red-light signal of a pedestrian light signal emitter. This is oriented transversely to the orientation of the traffic light signal emitter (which is decisive for the ego vehicle). The future change time is determined as a time which comes after the beginning by a predetermined duration. The predetermined duration usually corresponds to a specified duration and represents the delay between the switching of the transverse pedestrian lights of the pedestrian crossing and the motor vehicle traffic lights of the associated street (which is crossed by the pedestrian crossing). Instead of or in combination with the pedestrian light signal emitter, a bicyclist light signal emitter which has the same orientation as the pedestrian light signal emitter can be used. The bicyclist light signal emitter regulates traffic at a bicyclist crossing which crosses the traffic route which is regulated by the traffic light signal emitter. The predetermined duration is usually between 1 and 20 seconds, approximately between 5 and 15 seconds.

Detection of the end of a red-light signal of a pedestrian light signal emitter. This has the same orientation as the traffic light signal emitter which is decisive for the ego vehicle. The future change time is determined as a time which comes after the beginning by a predetermined duration. The predetermined duration usually corresponds to a specified duration and represents the delay between the switching of the lengthwise pedestrian lights of the pedestrian crossing of a first street and the motor vehicle lights of a second street, wherein the first and the second streets intersect. Instead of or in combination with the pedestrian light signal emitter, a bicyclist light signal emitter which has the same orientation as the pedestrian light signal emitter can be used. The bicyclist light signal emitter regulates traffic at a bicyclist crossing which crosses the traffic route which crosses the traffic route whose traffic is regulated by the traffic light signal emitter.

Instead of the end of the red-light signal, a beginning of the green light signal can be detected. Furthermore, instead of the beginning of the red-light signal, an end of the green light signal can be detected. The red-light signal and the green-light signal can also be detected, for example, in order to minimize recognition errors by means of mutual verification.

Furthermore, an end time of a stop-light signal of a streetcar or bus light signal emitter can be detected. This streetcar or bus light signal emitter relates to the same direction of travel as the traffic light signal emitter and, in particular, is oriented in the same direction. In Germany, for example, streetcar or bus light signal emitters are not color signal emitters, but rather are based on different shape signals. Image detection can therefore be used for detection. The future change time is determined as a time which comes after the end time of the stop-light signal of the streetcar or bus light signal emitter by a predetermined duration. This variation makes use of the fact that streetcars and busses which utilize the same roadway as the private motor vehicle traffic are switched sooner in order to provide the public transportation vehicles with the opportunity to move ahead of the vehicles of the private local transportation. The predetermined duration can be specified. Just as in the preceding variation, the predetermined duration is typically between 2 seconds and 20 seconds, in particular between 2 and 10 seconds.

The delay between the beginning of the red-light signal of the pedestrian light signal emitter transverse to the traffic light signal emitter, the end of the red-light signal of the pedestrian light signal emitter of the cross-street, or the end time of the stop-light signal of the streetcar or bus light signal emitter on the one hand and, on the other hand, the change time (to be detected) of the traffic light signal emitter can be stored in a stationary database or in a memory in the vehicle. The delay can be based on the actual driveaway time instead of on the change time. This temporal relationship between the mentioned light signal emitters and the change time or the driveaway time represents the switching phases of the light signal emitters and, since it is usually constant, it can be used in future determination steps of the future change time. The delay or temporal relationship can be stored, in particular, with an individualizing descriptor of the light signal emitter (for example, the geographic position or the names of the intersecting streets, optionally including a location and/or country name and/or the type or orientation of the light signal emitter). In a step for determining a future change time, this delay or the temporal relationship can be used in order to correct the predetermined duration between the future change and the related event or to equate the predetermined duration to the delay or the temporal relationship. Furthermore, a predetermined duration can be given as a specified standard value, which is corrected or replaced by a more appropriate value (for example, by the equating). In particular, the predetermined duration can be called up by calling up the delay or the temporal relationship which applies for the forthcoming light signal emitter by using the delay or temporal relationship linked to the location or the designation of the light signal emitter (in the memory or in the database) as the predetermined duration.

According to a further embodiment, the delay of the starting process which results due to the vehicles situated between the ego vehicle and the traffic light signal emitter is also taken into consideration. Since the ego vehicle cannot actually drive away until the preceding vehicle moves and vehicles which are at a standstill not directly at the light signal emitter drive away after a delay, the preparation of the start/stop system can also be delayed accordingly by means of automatic starting. It is proposed that the distance to the traffic light signal emitter be estimated. The predetermined duration by which the time of the automatic starting comes before the future change time is that much shorter, the greater the estimated distance is. This duration can also be negative or the automatic start can take place after the change time, in particular when the distance is particularly great or when the distance is greater than a predetermined value. In other words, the automatic starting can be delayed with respect to the change time; this delay is, in particular, a monotonously increasing function of the distance (or the number of vehicles between the ego vehicle and the traffic light signal emitter).

The distance can be estimated, for example, by a camera system or by a position-finding system, for example, a satellite-supported position-finding system which detects the position of the vehicle. Map data are preferably used, with which the position of the traffic light signal emitter which is decisive for the ego vehicle can be determined. The distance to the light signal emitter is closely linked to the number of vehicles which, in turn, is closely linked to the delay caused by the starting processes and driveaway processes of the preceding vehicles. As a result, the predetermined duration by which the automatic starting can be delayed with respect to the change time is a monotonously increasing function of the distance. The distance can be determined, in particular, by means of a position-finding system, for example, a satellite-supported position detection device (for example, GPS, GLONASS, Galileo, Beidou, . . . ) and/or a mobile communications-supported position-finding device. Preferably, map data are additionally utilized, on the basis of which the distance of the ego vehicle from the intersection at which the light signal emitter is located can be calculated.

A further possibility is to estimate the number of preceding vehicles up to the traffic light signal emitter. The number of motor vehicles between the ego vehicle and the traffic light signal emitter can be estimated, for example, by means of image detection by a camera system, by means of which, for example, the number of side-view mirrors or the contours of vehicles can be determined. The predetermined duration by which the start time of the automatic starting comes before the future change time is that much shorter, the greater the number is. This duration can also be negative, wherein the start time is delayed with respect to the change time. This delay is a monotonously increasing function of the estimated number. The estimation also includes, in particular, the counting of vehicle contours or other graphic features of vehicles. As previously mentioned, the distance to the light signal emitter or up to the intersection can be detected by means of a position-finding system. The number can be calculated on the basis of this distance (as an approximation), for example, by assuming a predetermined length (for example, 4, 5 or 6 meters) for each vehicle. The number results as a quotient of the distance divided by the predetermined (standard) length.

The aforementioned embodiments relate to a method for preparing a start/stop system in which a future (next) change time is determined on the basis of traffic control signals. It is also possible, however, to consider not (only) the control of the traffic flow, but also the traffic flow itself in order to determine the next driveaway process of the ego vehicle in advance.

To this end, a method for preparing a start/stop system of a motor vehicle drive for a future driveaway process is proposed, in which a future start time of the motor vehicle drive is determined on the basis of operating parameter information related to a preceding vehicle. In this case, the preceding vehicle is a vehicle which is located between the ego vehicle and the light signal emitter which is decisive therefore. The future start time is therefore detected by detecting an increase in torque or speed or by detecting a start of a drive of the at least one preceding vehicle. The future start time is preferably the time at which the drive of the preceding vehicle is started, although this can also be the time when the vehicle begins moving. When a preceding vehicle carries out a starting process, i.e., the torque and/or the speed are/is increased or the drive is started, it can be expected that the ego vehicle will also drive away shortly. It is furthermore provided that the internal combustion engine of the motor vehicle drive (of the ego vehicle) is started at the time at which the future driveaway process is determined or is delayed by a predetermined duration with respect thereto. Therefore, when an increase in torque or speed or a start of a preceding vehicle is detected, the internal combustion engine of the ego motor vehicle is automatically started (without action by the driver and, in particular, without regard for the state of the gas pedal). Alternatively, the start can be delayed by a predetermined duration with respect thereto.

If it is therefore determined at a certain time that the speed is increased or a start of a drive of a preceding vehicle is imminent, a wait ensues for the predetermined duration starting at this time in order to then automatically carry out the start of the internal combustion engine at the end of the duration. The delay is utilized for adapting to the fact that, optionally, the ego vehicle must remain at a standstill for a duration after the furthermost vehicle was started and therefore reflects the delay between the start of the first vehicle and the possibility of moving the ego vehicle.

The increase in torque or speed or the start is detected via reception of a radio signal from the at least one preceding vehicle. In this case, the radio signal represents the torque, the speed, or a start of the drive of the preceding vehicle. The radio signal in this case is a car-to-car radio signal. The start of the vehicle or the increase in torque or speed can be determined via optical detection of the parking light and/or the braking lights of the preceding vehicle. The start is detected in this case by determining when the braking lights of the preceding vehicle go out or when the parking light (temporarily) goes out. Both events are directly linked to the start-up of the drive or to the beginning of the driving away of the preceding vehicle.

It was mentioned above that a radio signal originating from the at least one preceding vehicle can be received by means of the ego vehicle. As a result, the ego vehicle can respond to the detected start of the preceding vehicle in that the internal combustion engine is automatically started (with delay or without delay). Complementary thereto, a signal (from the ego vehicle) which indicates the speed, the torque and/or a starting process is transmitted. In this case, the ego vehicle is the transmitter and, therefore, is an information source for further vehicles which are equipped according to the method described here in order to receive corresponding signals. The signal is transmitted by the ego vehicle, wherein the signal can be transmitted, in particular, by the motor vehicle drive or by means of a control which controls the motor vehicle drive. In this case, the motor vehicle drive or the control comprises a radio interface or is connected to a radio interface in order to transmit the signal via this radio interface. The signal can be transmitted as a radio signal in particular, wherein optical signals or acoustic signals (ultrasonic signals) as initially mentioned are also possible. The radio signal received by the ego vehicle (or the signal transmitted by the ego vehicle) can represent the start of the drive in the sense of a start command, or can indicate only the speed jump or the torque jump instead of a torque signal or speed signal. Previously it was mentioned that the ego vehicle receives a radio signal from the at least one preceding vehicle.

Alternatively, instead of a radio signal, an optical signal which represents the content of the radio signal, or a sound signal (in particular the ultrasonic signal) can be received. A corresponding optical signal or ultrasonic signal is designed as initially described. A corresponding optical signal can be emitted, for example, by a lighting device of a preceding vehicle as a modulated light signal, or can be emitted by a preceding vehicle by means of a distance detection device which functions on the basis of ultrasound and is located there.

The signal which is emitted by the ego vehicle or by a preceding vehicle can be transmitted directly or can be transmitted to a database, from which, in turn, the data stored there can be called up. The database functions as a storing transmission unit. It can therefore be provided that the signal can be received by means of a database, in particular by means of a radio interface of the database. This radio interface can be designed according to a car-to-X protocol.

Furthermore, at least one time at which an increase in the speed or the torque occurs or at which the starting process occurs is stored in the database. The time can be stored alone or in combination with further data linked thereto, for example, the relative position between the ego vehicle and the preceding vehicle, an (absolute) position of the traffic light signal emitter which is decisive for the ego vehicle (and, therefore, for the preceding vehicle) or other data, such as, for example, the response of the drive of the vehicle to which the speed, the torque, or the starting process relates.

FIG. 1 shows a vehicle 10 having a start/stop system. The ego vehicle 10 is located at a traffic light signal emitter 20 which regulates the traffic flow of the traffic route on which the ego vehicle 10 is located. The traffic light signal emitter is therefore decisive for the ego vehicle 10. In order to enable access to a started internal combustion engine when it is time to drive away, the future change time of the traffic light signal emitter 20 from red to green is determined for the ego vehicle 10. The internal combustion engine of the ego vehicle 10 is automatically started before the future change time, in particular at a start time which can come before the future change time by a predetermined duration. Instead of utilizing the change time of the traffic light signal emitter 20 as the decisive event for the future driveaway process of the ego vehicle 10, a future start time of the motor vehicle drive of the ego vehicle 10 can be determined by detecting an increase in torque or speed or by detecting a start of the drive of the preceding vehicle 30.

Various data sources can be used for these approaches. On the one hand, a radio signal can be emitted by the traffic light signal emitter 20, in particular by means of a radio interface 22. This time signal is transmitted as a radio signal from the radio interface 22 to the ego vehicle 10 which comprises a corresponding radio interface 12. Alternatively, the time signal can be emitted as an optical signal, wherein the interface labeled with 22 is an open interface which indicates a future change time of the light signal emitter 20. Alternatively, lighting systems 32 of a preceding vehicle 30 can be used in order to emit the optical signal to the ego vehicle 10. To this end, the ego vehicle can comprise an optical sensor 14 (preferably an electronic camera or a camera system) which is oriented in the direction of travel. The radio signal can also originate from the vehicle 30, in particular when this vehicle comprises a radio interface 34 which can emit the time signal, for example, based on the optical detection of a change time by means of a device of the vehicle 30. In addition, the preceding vehicle can comprise a source of sound, in particular a distance detection system 36, wherein the vehicle 30 either detects or forwards the time signal itself in this case as well. Instead of an acoustic-based distance detection system 36, a radar-supported distance detection system 36 can be used. The electromagnetic signals thereof can carry, via suitable modulation, information which represents the time signal.

A database 40 can be provided in order to determine the future change time on the basis of historical data. This database detects and stores previous change times which are determined, for example, by multiple vehicles. For the transmission, such a vehicle, for example, the vehicle 30, can transmit the data as radio data to a radio interface 42 of the database 40. Alternatively, in further vehicles, for example, in the vehicle 30, a memory can be provided which stores previous change times from red light to green light for the traffic light signal emitter 20 and can transmit these change times to the ego vehicle, for example, by means of the radio interfaces 34 and 12. The further vehicle 30 does not necessarily have a memory, but may also transmit previous change times to the ego vehicle 10 when these occur. What is stored in a memory within the ego vehicle 10 in this case is when change times from red to green have occurred for the light signal emitter 20. This approach uses the detected change times of the light signal emitter, i.e., historical data of the traffic control, in order to determine therefrom a future change time, i.e., the next change time, particularly via extrapolation.

Furthermore, the driving behavior of multiple vehicles (at the traffic light signal emitter 20) can be used as the basis for the historical data on the basis of which the future (subsequent) change time is extrapolated. To this end, previous stop phases of multiple vehicles, for example, the vehicle 30, are transmitted to the ego vehicle 10 directly or via the stationary database 40 by means of transmission to the radio interface 42 thereof. The transmission paths for these stop phases can be the same as for the time signal. A future change time is determined on the basis of the transmitted previous stop phases. The time curve of the traffic control is therefore inferred (for the future) on the basis of the preceding traffic flow. This is possible since the traffic control by means of the traffic light signal emitter 20 is directly linked to the traffic flow of the multiple vehicles (and vice versa).

A light signal emitter which is controlled by the same control as the traffic light signal emitter can be used as a further data source for detecting the future change time of the light signal emitter 20. This is a light signal emitter, in particular, which is used at the same intersection and, in particular, is used for regulating the same traffic route, for example, the bus light signal emitter 60. The use of a pedestrian light signal emitter 50 is shown, which is oriented transversely to the traffic light signal emitter and regulates a traffic route (specifically the pedestrian crossing 52) which crosses the traffic route (specifically the street 2) which is regulated by the light signal emitter 20. In particular, the pedestrian light signal emitter 50 relates to a traffic route perpendicular to the traffic route which is regulated by the traffic light signal emitter 20. The traffic light signal emitter 20 and the pedestrian light signal emitter 50 are controlled by the same control 24, in particular by the control which controls all the light signal emitters of this intersection. Instead of the pedestrian light signal emitter, a bicyclist light signal emitter can be used, provided bicyclist traffic is allowed on the traffic route 52. Since the green phase for the traffic route 52 ends before the green phase of the traffic light signal emitter 20 begins, the beginning of a red-light signal of the pedestrian light signal emitter 50 can be used for determining a future change time for the traffic light signal emitter 20.

In addition, a light signal emitter 70 which is controlled by the same control 24 as the traffic light signal emitter 20 can be used as a further data source for detecting the future change time of the light signal emitter 20. This is, for example, a light signal emitter 70 which is used at the same intersection and, in particular, is used for regulating a traffic route 72 which extends across a street 4 which crosses the street 2 (which is decisive for the ego vehicle 10). The use of a pedestrian light signal emitter 70 is shown, which is oriented in the same direction as the traffic light signal emitter 60 and regulates a traffic route (specifically the pedestrian crossing 72) which crosses the street 4 which, in turn, crosses the street 2. The traffic on the street 2 is regulated by the light signal emitter 20. In particular, the pedestrian light signal emitter 70 relates to a traffic route oriented lengthwise with respect to the traffic route (i.e., the street 2) which is regulated by the traffic light signal emitter 20. The traffic light signal emitter 20 and the pedestrian light signal emitter 70 are controlled by the same control 24, in particular by the control 24 which controls all the light signal emitters of this intersection. Instead of the pedestrian light signal emitter 70, a bicyclist light signal emitter located at the same point can be used, provided bicycle traffic is also permitted on the traffic route 72. Since the case for numerous intersections is that the green phase for the traffic route 72 begins before the green phase of the traffic light signal emitter 20 begins, the beginning of a green-light signal of the pedestrian light signal emitter 70 can be used for determining a future change time for the traffic light signal emitter 20.

Furthermore, a bus light signal emitter 60 (generally: streetcar or bus signal emitter) can be used in order to determine the future change time of the traffic light signal emitter 20. Since the public local traffic has its own light signal emitters which are switched before the rest of the traffic, provided these share the same traffic route, the beginning of the driving signal or the end time of the stop signal of a light signal emitter can be used for the public local traffic in order to estimate the future change time for the traffic light signal emitter 20.

When a control is used, for example, a control for the light signal emitter of the entire intersection, for example, such as the control 24, this can comprise a radio module 26 in order to transmit the beginning of green phases, as the time signal, in advance. The time signal is preferably emitted together with a designation of the traffic direction or the applicable light signal emitter. Vehicles which are designed for carrying out the method described here can then detect the future change time of the control 24 on the basis of the time signal emitted by the radio module 26.

The dashed arrows represent controlling connections between the control 24 and the light signal emitters 20, 50, 60 and 70.

The image detection unit 14 of the ego vehicle 10 can be further designed to determine the distance A up to the traffic light signal emitter 20. The predetermined duration by which the start time comes before the future change time is that much shorter, the greater the distance A is. Furthermore, the image detection unit 14 can be used for determining the number of preceding vehicles, in this case 1, since only the vehicle 30 is situated in front of the ego vehicle 10. Since, in a first number, which is greater than a second number, the predetermined duration is shorter than is the case with the second number. The image detection unit 14 can correspond to an optical sensor in the sense of a camera or a stereo camera system, optionally including image recognition downstream of the camera.

Furthermore, it can be provided that the radio interface 34 of the preceding vehicle 30 emits a start signal when the drive of the preceding vehicle 30 is started. This signal is received by the ego vehicle 10 as an indication that a start time for its own motor vehicle drive is imminent. In response to the reception of such a start signal of a preceding vehicle 30, the ego vehicle 10 can carry out a start in order to thereby be prepared for a future starting process. The signal can be transmitted directly from the radio module 34 of the preceding vehicle to the radio module 12 of the ego vehicle 10. Alternatively, the radio module 34 can transmit the corresponding signal to the radio module 42 of the database 40. The radio module 12 of the ego vehicle 10 accesses this information via the radio module 42 of the database 40. An indirect transmission is therefore also possible, in which the radio module 34 of the preceding vehicle 30 initially transmits the data via the database 40 to the ego vehicle 10. The radio interface 12 of the ego vehicle 10 can also transmit the starting process or the driveaway process of this ego vehicle, or at least one of the times thereof, to the database 40 in that a radio signal is transmitted from the radio module 12 to the radio module 42. This radio signal represents at least the time of the start or the driveaway process of the ego vehicle 10 and is stored in the database 40. A trailing vehicle can wirelessly access this information as described above.

Alternatively to the direct transmission by means of radio, a vehicle lighting system 32, for example, the tail lamps, can be modulated in order to therefore emit the start signal, the speed and/or the torque of the preceding vehicle 30, and so the trailing ego vehicle 10 can detect this information, for example, via an optical detection unit 40.

LIST OF REFERENCE NUMBERS 2 street
4 street which crosses the street 2
10 vehicle, ego vehicle
12 radio interface of the ego vehicle
14 image detection unit of the ego vehicle 10
20 traffic light signal emitter
22 radio interface of the traffic light signal emitter or a higher-order control 24
24 control at a higher level than the traffic light signal emitter 20, the pedestrian light signal emitter 50, and the bus light signal emitter 60
26 radio module of the control
30 preceding vehicle
32 lighting system (braking lights, parking light) of the preceding vehicle
34 radio interface of the preceding vehicle
36 ultrasonic distance detection system
40 database
42 radio interface of the database 40
50 pedestrian light signal emitter (decisive for the pedestrian crossing over the street 2)
52 pedestrian crossing over the street 2
60 streetcar or bus signal emitter
70 pedestrian light signal emitter (decisive for the pedestrian crossing over the street 4)
72 pedestrian crossing over the street 4
A distance (of the ego vehicle) up to the traffic light signal emitter 20

The invention claimed is:

1. A method for preparing a start/stop system of a motor vehicle drive for a future driveaway process, the method comprising:
receiving a time signal comprising at least one indicator chosen from the group consisting of a pedestrian light signal emitter, a streetcar light signal emitter, a bus light signal emitter, and a bicycle path light emitter;
using the time signal received to determine a future change time of a traffic light signal emitter from red light to green light based upon a correlation between the time signal and an anticipated delay for the future change time; and
automatically starting an internal combustion engine of the motor vehicle drive at a start time which comes before the future change time by a predetermined duration.

2. The method according to claim 1, further comprising receiving a further time signal, wherein:
the further time signal is emitted, as a radio signal, from at least one further vehicle or from a higher-order control of the traffic light signal emitter; or
the further time signal is emitted, as an optical signal, from a further vehicle or from the traffic light signal emitter; or
the further time signal is emitted as an acoustic signal from a further vehicle or from a source of sound installed downstream of the traffic light signal emitter.

3. The method according to claim 1, wherein the determination step includes:
detecting previous change times from red light to green light by means of optical detection devices of multiple vehicles;
transmitting the previous change times from the multiple vehicles to the start/stop system of the motor vehicle drive directly or via a stationary database; and
extrapolating the future change time by means of the start/stop system of the motor vehicle drive on the basis of the transmitted, previous change times; or wherein the determination step includes:
detecting previous stop phases of multiple vehicles;
transmitting the previous change times from the multiple vehicles to the start/stop system of the motor vehicle drive directly or via a stationary database; and
extrapolating the future change time by means of the start/stop system of the motor vehicle drive on the basis of the transmitted, previous stop phases.

4. The method according to claim 1, wherein the determination step includes:
detecting the beginning of a red-light signal of a pedestrian light signal emitter which is oriented transversely to the traffic light signal emitter and determining the future change time as a time which comes after the beginning by a predetermined duration; or
detecting the end of a red-light signal of a pedestrian light signal emitter which is oriented in the same direction as the traffic light signal emitter and determining the future change time as a time which comes after the beginning by a predetermined duration; or
detecting an end time of a stop light signal of a streetcar or bus light signal emitter which is oriented in the same direction of travel as the traffic light signal emitter and determining the future change time as a time which comes after the end time by a predetermined duration.

5. The method according to claim 1, further including:
estimating the distance (A) to the traffic light signal emitter; wherein the predetermined duration by which the start time of the automatic starting comes before the future change time is that much shorter, the greater the estimated distance (A) is, or wherein the start time is delayed with respect to the change time that much more, the greater the estimated distance (A) is.

6. The method according to claim 1, further including estimating the number of preceding vehicles up to the traffic light signal emitter;
   wherein the predetermined duration by which the start time of the automatic starting comes before the future change time is that much shorter, the greater the number is, or wherein the start time is delayed with respect to the change time by that much more, the greater the number is.

7. A method for preparing a start/stop system of a motor vehicle drive for a future driveaway process, the method including:
   determining a future driveaway process of the motor vehicle drive by detecting an increase in torque or an increase in speed or a start of a drive of at least one preceding vehicle; and
   automatically starting an internal combustion engine of the motor vehicle drive at the time at which the future driveaway process is determined or delayed with respect thereto by a predetermined duration.

8. The method according to claim 7, wherein the increase in torque or speed or the start is detected via reception of a radio signal from the at least one preceding vehicle, which signal represents one of: the torque, the speed, or a drive start of the preceding vehicle.

9. The method according to claim 7, further including transmitting a signal which represents the speed, the torque and/or a starting process, by means of the motor vehicle drive or by means of a control which controls the motor vehicle drive.

10. The method according to claim 9, further including:
   receiving the signal by means of a database; and
   storing at least one time at which an increase in the speed or the torque occurs or at which the starting process occurs in the database.

11. A system for operating a motor vehicle drive, the system comprising:
   an internal combustion engine for driving the motor vehicle; and
   a controller configured to:
   receive a time signal comprising at least one indicator chosen from the group consisting of a pedestrian light signal emitter, a streetcar light signal emitter, a bus light signal emitter, and a bicycle path light emitter;
   use the time signal received to determine a future change time of a traffic light signal emitter from red light to green light based upon a correlation between the time signal and an anticipated delay for the future change time; and
   automatically start the internal combustion engine of the motor vehicle drive at a start time which comes before the future change time by a predetermined duration.

12. A system according to claim 11, wherein the controller receives a further time signal which represents the future change time or characterizes the time at which the change time occurs; and
   the further time signal is emitted, as a radio signal, from at least one further vehicle or from a higher-order control of the traffic light signal emitter; or
   the further time signal is emitted, as an optical signal, from a further vehicle or from the traffic light signal emitter; or
   the further time signal is emitted as an acoustic signal, in particular as an ultrasonic signal, from a further vehicle or from a source of sound installed downstream of the traffic light signal emitter.

13. A system according to claim 11, further comprising:
   a plurality of optical detection devices associated with multiple vehicles to detect previous change times from red light to green light;
   a server transmitting the previous change times from the plurality of optical detection devices to the controller directly or via a stationary database; and
   wherein the controller extrapolates the future change time on the basis of the transmitted, previous change times.

14. A system according to claim 11, wherein the controller is further configured to:
   receive a signal indicating the beginning of a red-light signal of a pedestrian light signal emitter which is oriented transversely to the traffic light signal emitter; and
   determine the future change time as a time which comes after the beginning by a predetermined duration.

15. A system according to claim 11, wherein the controller is further configured to:
   detect the end of a red-light signal of a pedestrian light signal emitter which is oriented in the same direction as the traffic light signal emitter; and
   determine the future change time as a time which comes after the beginning by a predetermined duration.

16. A system according to claim 11, wherein the controller is further configured to:
   detect an end time of a stop light signal of a streetcar or bus light signal emitter which is oriented in the same direction of travel as the traffic light signal emitter; and
   determine the future change time as a time which comes after the end time by a predetermined duration.

17. A system according to claim 11, wherein the controller estimates the distance (A) to the traffic light signal emitter; and
   wherein the predetermined duration by which the start time of the automatic starting comes before the future change time is that much shorter, the greater the estimated distance (A) is, or wherein the start time is delayed with respect to the change time that much more, the greater the estimated distance (A) is.

18. A system according to claim 11, wherein the controller estimates the number of preceding vehicles up to the traffic light signal emitter; and
   wherein the predetermined duration by which the start time of the automatic starting comes before the future change time is that much shorter, the greater the number is, or wherein the start time is delayed with respect to the change time by that much more, the greater the number is.

* * * * *